US012689833B2

(12) United States Patent (10) Patent No.: US 12,689,833 B2

Fluegel (45) Date of Patent: ***Jul. 21, 2026

(54) MULTI-CAMERA VEHICULAR VISION SYSTEM

(71) Applicant: MAGNA ELECTRONICS INC., Auburn Hills, MI (US)

(72) Inventor: Sebastian Fluegel, Ottobrunn (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 291 days.

This patent is subject to a terminal disclaimer.

(21) Appl. No.: 17/654,604

(22) Filed: Mar. 14, 2022

(65) Prior Publication Data

US 2022/0210324 A1     Jun. 30, 2022

Related U.S. Application Data

(63) Continuation of application No. 15/420,239, filed on Jan. 31, 2017, now Pat. No. 11,277,558.

(Continued)

(51) Int. Cl.
    *H04N 23/698*        (2023.01)
    *B60K 35/10*        (2024.01)
    (Continued)

(52) U.S. Cl.
    CPC ........... *H04N 23/698* (2023.01); *B60K 35/10* (2024.01); *B60K 35/22* (2024.01); *B60K 35/60* (2024.01);
    (Continued)

(58) Field of Classification Search
    CPC ..... B60R 1/27; B60R 11/04; B60R 2300/105; B60R 2300/303; B60R 2001/1253;
    (Continued)

(56) References Cited

U.S. PATENT DOCUMENTS

| 4,987,357 | A | 1/1991 | Masaki |
| 4,987,410 | A | 1/1991 | Berman et al. |
| | | (Continued) | |

FOREIGN PATENT DOCUMENTS

| EP | 0640903 A1 | 3/1995 |
| EP | 2377094 A1 | 10/2011 |
| | (Continued) | |

*Primary Examiner* — Daniel Chang

(74) *Attorney, Agent, or Firm* — HONIGMAN LLP

(57) ABSTRACT

A vehicular vision system includes at least two cameras disposed at a vehicle. The at least two cameras includes a first camera and a second camera. The first camera is disposed at an in-cabin side of a windshield of the vehicle and views through the windshield forward of the vehicle. Each of the first camera and the second camera includes a first CMOS imaging array having at least one million photosensor elements arranged in rows and columns. The second camera includes an encryptor that encrypts image data that is captured by the second camera. The first camera includes a decryptor that decrypts image data encrypted by the second camera. Image data captured by the first camera and image data captured by the second camera may be processed at an electronic control unit (ECU) for a machine vision system of the vehicle.

21 Claims, 6 Drawing Sheets

Related U.S. Application Data

(60) Provisional application No. 62/289,442, filed on Feb. 1, 2016.

(51) Int. Cl.

| | |
|---|---|
| *B60K 35/22* | (2024.01) |
| *B60K 35/60* | (2024.01) |
| *B60K 35/81* | (2024.01) |
| *B60R 1/12* | (2006.01) |
| *B60R 1/27* | (2022.01) |
| *B60R 11/04* | (2006.01) |
| *H04N 7/18* | (2006.01) |
| *H04N 23/661* | (2023.01) |
| *B60K 35/28* | (2024.01) |
| *B60R 11/00* | (2006.01) |

(52) U.S. Cl.
CPC ................ *B60K 35/81* (2024.01); *B60R 1/12* (2013.01); *B60R 1/27* (2022.01); *B60R 11/04* (2013.01); *H04N 7/181* (2013.01); *H04N 23/662* (2023.01); *B60K 35/28* (2024.01); *B60K 2360/173* (2024.01); *B60K 2360/21* (2024.01); *B60K 2360/777* (2024.01); *B60R 2001/1253* (2013.01); *B60R 2011/004* (2013.01); *B60R 2300/105* (2013.01); *B60R 2300/303* (2013.01); *B60R 2300/307* (2013.01); *B60R 2300/408* (2013.01); *B60R 2300/607* (2013.01); *B60R 2300/8033* (2013.01)

(58) Field of Classification Search
CPC . H04L 63/0428; H04L 2463/062; H04L 9/14; H04W 4/80; H04W 84/20; H04W 12/069; H04W 74/085; H04W 4/40; H04W 4/48; G06F 21/602
See application file for complete search history.

(56) References Cited

U.S. PATENT DOCUMENTS

| | | | |
|---|---|---|---|
| 4,991,054 | A | 2/1991 | Walters |
| 5,001,558 | A | 3/1991 | Burley et al. |
| 5,003,288 | A | 3/1991 | Wilhelm |
| 5,012,082 | A | 4/1991 | Watanabe |
| 5,016,977 | A | 5/1991 | Baude et al. |
| 5,027,001 | A | 6/1991 | Torbert |
| 5,027,200 | A | 6/1991 | Petrossian et al. |
| 5,044,706 | A | 9/1991 | Chen |
| 5,050,966 | A | 9/1991 | Berman |
| 5,055,668 | A | 10/1991 | French |
| 5,059,877 | A | 10/1991 | Teder |
| 5,064,274 | A | 11/1991 | Alten |
| 5,072,154 | A | 12/1991 | Chen |
| 5,075,768 | A | 12/1991 | Wirtz et al. |
| 5,086,253 | A | 2/1992 | Lawler |
| 5,096,287 | A | 3/1992 | Kakinami et al. |
| 5,097,362 | A | 3/1992 | Lynas |
| 5,121,200 | A | 6/1992 | Choi |
| 5,124,549 | A | 6/1992 | Michaels et al. |
| 5,130,709 | A | 7/1992 | Toyama et al. |
| 5,166,681 | A | 11/1992 | Bottesch et al. |
| 5,168,378 | A | 12/1992 | Black |
| 5,170,374 | A | 12/1992 | Shimohigashi et al. |
| 5,172,235 | A | 12/1992 | Wilm et al. |
| 5,172,317 | A | 12/1992 | Asanuma et al. |
| 5,177,606 | A | 1/1993 | Koshizawa |
| 5,177,685 | A | 1/1993 | Davis et al. |
| 5,182,502 | A | 1/1993 | Slotkowski et al. |
| 5,184,956 | A | 2/1993 | Langlais et al. |
| 5,189,561 | A | 2/1993 | Hong |
| 5,193,000 | A | 3/1993 | Lipton et al. |
| 5,193,029 | A | 3/1993 | Schofield et al. |
| 5,204,778 | A | 4/1993 | Bechtel |
| 5,208,701 | A | 5/1993 | Maeda |
| 5,208,750 | A | 5/1993 | Kurami et al. |
| 5,214,408 | A | 5/1993 | Asayama |
| 5,243,524 | A | 9/1993 | Ishida et al. |
| 5,245,422 | A | 9/1993 | Borcherts et al. |
| 5,276,389 | A | 1/1994 | Levers |
| 5,285,060 | A | 2/1994 | Larson et al. |
| 5,289,182 | A | 2/1994 | Brillard et al. |
| 5,289,321 | A | 2/1994 | Secor |
| 5,305,012 | A | 4/1994 | Faris |
| 5,307,136 | A | 4/1994 | Saneyoshi |
| 5,309,137 | A | 5/1994 | Kajiwara |
| 5,313,072 | A | 5/1994 | Vachss |
| 5,325,096 | A | 6/1994 | Pakett |
| 5,325,386 | A | 6/1994 | Jewell et al. |
| 5,329,206 | A | 7/1994 | Slotkowski et al. |
| 5,331,312 | A | 7/1994 | Kudoh |
| 5,336,980 | A | 8/1994 | Levers |
| 5,341,437 | A | 8/1994 | Nakayama |
| 5,343,206 | A | 8/1994 | Ansaldi et al. |
| 5,351,044 | A | 9/1994 | Mathur et al. |
| 5,355,118 | A | 10/1994 | Fukuhara |
| 5,359,666 | A | 10/1994 | Nakayama et al. |
| 5,374,852 | A | 12/1994 | Parkes |
| 5,386,285 | A | 1/1995 | Asayama |
| 5,394,333 | A | 2/1995 | Kao |
| 5,406,395 | A | 4/1995 | Wilson et al. |
| 5,408,346 | A | 4/1995 | Trissel et al. |
| 5,410,346 | A | 4/1995 | Saneyoshi et al. |
| 5,414,257 | A | 5/1995 | Stanton |
| 5,414,461 | A | 5/1995 | Kishi et al. |
| 5,416,313 | A | 5/1995 | Larson et al. |
| 5,416,318 | A | 5/1995 | Hegyi |
| 5,416,478 | A | 5/1995 | Morinaga |
| 5,424,952 | A | 6/1995 | Asayama |
| 5,426,294 | A | 6/1995 | Kobayashi et al. |
| 5,430,431 | A | 7/1995 | Nelson |
| 5,434,407 | A | 7/1995 | Bauer et al. |
| 5,440,428 | A | 8/1995 | Hegg et al. |
| 5,444,478 | A | 8/1995 | Lelong et al. |
| 5,451,822 | A | 9/1995 | Bechtel et al. |
| 5,457,493 | A | 10/1995 | Leddy et al. |
| 5,461,357 | A | 10/1995 | Yoshioka et al. |
| 5,461,361 | A | 10/1995 | Moore |
| 5,469,298 | A | 11/1995 | Suman et al. |
| 5,471,515 | A | 11/1995 | Fossum et al. |
| 5,475,494 | A | 12/1995 | Nishida et al. |
| 5,487,116 | A | 1/1996 | Nakano et al. |
| 5,498,866 | A | 3/1996 | Bendicks et al. |
| 5,500,766 | A | 3/1996 | Stonecypher |
| 5,510,983 | A | 4/1996 | Lino |
| 5,515,448 | A | 5/1996 | Nishitani |
| 5,521,633 | A | 5/1996 | Nakajima et al. |
| 5,528,698 | A | 6/1996 | Kamei et al. |
| 5,529,138 | A | 6/1996 | Shaw et al. |
| 5,530,240 | A | 6/1996 | Larson et al. |
| 5,530,420 | A | 6/1996 | Tsuchiya et al. |
| 5,535,144 | A | 7/1996 | Kise |
| 5,535,314 | A | 7/1996 | Alves et al. |
| 5,537,003 | A | 7/1996 | Bechtel et al. |
| 5,539,397 | A | 7/1996 | Asanuma et al. |
| 5,541,590 | A | 7/1996 | Nishio |
| 5,550,677 | A | 8/1996 | Schofield et al. |
| 5,555,312 | A | 9/1996 | Shima et al. |
| 5,555,555 | A | 9/1996 | Sato et al. |
| 5,559,695 | A | 9/1996 | Daily |
| 5,568,027 | A | 10/1996 | Teder |
| 5,574,443 | A | 11/1996 | Hsieh |
| 5,581,464 | A | 12/1996 | Woll et al. |
| 5,594,222 | A | 1/1997 | Caldwell |
| 5,614,788 | A | 3/1997 | Mullins |
| 5,619,370 | A | 4/1997 | Guinosso |
| 5,634,709 | A | 6/1997 | Iwama |
| 5,638,116 | A | 6/1997 | Shimoura et al. |
| 5,642,299 | A | 6/1997 | Hardin et al. |
| 5,648,835 | A | 7/1997 | Uzawa |
| 5,650,944 | A | 7/1997 | Kise |
| 5,660,454 | A | 8/1997 | Mori et al. |

(56)                References Cited

U.S. PATENT DOCUMENTS

| | | | |
|---|---|---|---|
| 5,661,303 A | 8/1997 | Teder | |
| 5,666,028 A | 9/1997 | Bechtel et al. | |
| 5,670,935 A | 9/1997 | Schofield et al. | |
| 5,675,489 A | 10/1997 | Pomerleau | |
| 5,677,851 A | 10/1997 | Kingdon et al. | |
| 5,699,044 A | 12/1997 | Van Lente et al. | |
| 5,724,316 A | 3/1998 | Brunts | |
| 5,737,226 A | 4/1998 | Olson et al. | |
| 5,757,949 A | 5/1998 | Kinoshita et al. | |
| 5,760,826 A | 6/1998 | Nayar | |
| 5,760,828 A | 6/1998 | Cortes | |
| 5,760,931 A | 6/1998 | Saburi et al. | |
| 5,760,962 A | 6/1998 | Schofield et al. | |
| 5,761,094 A | 6/1998 | Olson et al. | |
| 5,765,116 A | 6/1998 | Wilson-Jones et al. | |
| 5,781,437 A | 7/1998 | Wiemer et al. | |
| 5,790,403 A | 8/1998 | Nakayama | |
| 5,790,973 A | 8/1998 | Blaker et al. | |
| 5,793,308 A | 8/1998 | Rosinski et al. | |
| 5,793,420 A | 8/1998 | Schmidt | |
| 5,796,094 A | 8/1998 | Schofield et al. | |
| 5,837,994 A | 11/1998 | Stam et al. | |
| 5,844,505 A | 12/1998 | Van Ryzin | |
| 5,844,682 A | 12/1998 | Kiyomoto et al. | |
| 5,845,000 A | 12/1998 | Breed et al. | |
| 5,848,802 A | 12/1998 | Breed et al. | |
| 5,850,176 A | 12/1998 | Kinoshita et al. | |
| 5,850,254 A | 12/1998 | Takano et al. | |
| 5,867,591 A | 2/1999 | Onda | |
| 5,877,707 A | 3/1999 | Kowalick | |
| 5,877,897 A | 3/1999 | Schofield et al. | |
| 5,878,370 A | 3/1999 | Olson | |
| 5,883,684 A | 3/1999 | Millikan et al. | |
| 5,883,739 A | 3/1999 | Ashihara et al. | |
| 5,884,212 A | 3/1999 | Lion | |
| 5,890,021 A | 3/1999 | Onoda | |
| 5,896,085 A | 4/1999 | Mori et al. | |
| 5,899,956 A | 5/1999 | Chan | |
| 5,904,725 A | 5/1999 | Iisaka et al. | |
| 5,914,815 A | 6/1999 | Bos | |
| 5,920,367 A | 7/1999 | Kajimoto et al. | |
| 5,923,027 A | 7/1999 | Stam et al. | |
| 5,938,810 A | 8/1999 | De Vries, Jr. et al. | |
| 5,940,120 A | 8/1999 | Frankhouse et al. | |
| 5,949,331 A | 9/1999 | Schofield et al. | |
| 5,956,181 A | 9/1999 | Lin | |
| 5,959,367 A | 9/1999 | O'Farrell et al. | |
| 5,959,555 A | 9/1999 | Furuta | |
| 5,963,247 A | 10/1999 | Banitt | |
| 5,963,609 A * | 10/1999 | Huang | G06F 13/4282 |
| | | | 713/400 |
| 5,964,822 A | 10/1999 | Alland et al. | |
| 5,990,469 A | 11/1999 | Bechtel et al. | |
| 5,990,649 A | 11/1999 | Nagao et al. | |
| 6,009,336 A | 12/1999 | Harris et al. | |
| 6,020,704 A | 2/2000 | Buschur | |
| 6,049,171 A | 4/2000 | Stam et al. | |
| 6,052,124 A | 4/2000 | Stein et al. | |
| 6,066,933 A | 5/2000 | Ponziana | |
| 6,084,519 A | 7/2000 | Coulling et al. | |
| 6,087,953 A | 7/2000 | DeLine et al. | |
| 6,091,833 A | 7/2000 | Yasui et al. | |
| 6,097,024 A | 8/2000 | Stam et al. | |
| 6,100,811 A | 8/2000 | Hsu et al. | |
| 6,139,172 A | 10/2000 | Bos et al. | |
| 6,144,022 A | 11/2000 | Tenenbaum et al. | |
| 6,158,655 A | 12/2000 | DeVries, Jr. et al. | |
| 6,175,300 B1 | 1/2001 | Kendrick | |
| 6,201,642 B1 | 3/2001 | Bos | |
| 6,222,460 B1 | 4/2001 | DeLine et al. | |
| 6,226,061 B1 | 5/2001 | Tagusa | |
| 6,243,003 B1 | 6/2001 | DeLine et al. | |
| 6,250,148 B1 | 6/2001 | Lynam | |
| 6,259,412 B1 | 7/2001 | Duroux | |
| 6,259,423 B1 | 7/2001 | Tokito et al. | |
| 6,266,082 B1 | 7/2001 | Yonezawa et al. | |
| 6,266,442 B1 | 7/2001 | Laumeyer et al. | |
| 6,285,393 B1 | 9/2001 | Shimoura et al. | |
| 6,285,778 B1 | 9/2001 | Nakajima et al. | |
| 6,297,781 B1 | 10/2001 | Turnbull et al. | |
| 6,310,611 B1 | 10/2001 | Caldwell | |
| 6,313,454 B1 | 11/2001 | Bos et al. | |
| 6,317,057 B1 | 11/2001 | Lee | |
| 6,320,282 B1 | 11/2001 | Caldwell | |
| 6,333,759 B1 | 12/2001 | Mazzilli | |
| 6,359,392 B1 | 3/2002 | He | |
| 6,370,329 B1 | 4/2002 | Teuchert | |
| 6,396,397 B1 | 5/2002 | Bos et al. | |
| 6,411,328 B1 | 6/2002 | Franke et al. | |
| 6,424,273 B1 | 7/2002 | Gutta et al. | |
| 6,430,303 B1 | 8/2002 | Naoi et al. | |
| 6,433,817 B1 | 8/2002 | Guerra | |
| 6,442,465 B2 | 8/2002 | Breed et al. | |
| 6,477,464 B2 | 11/2002 | McCarthy et al. | |
| 6,485,155 B1 | 11/2002 | Duroux et al. | |
| 6,497,503 B1 | 12/2002 | Dassanayake et al. | |
| 6,539,306 B2 | 3/2003 | Turnbull | |
| RE38,055 E * | 4/2003 | Tsukamoto | H04L 63/0428 |
| | | | 375/E7.017 |
| 6,547,133 B1 | 4/2003 | Devries, Jr. et al. | |
| 6,553,130 B1 | 4/2003 | Lemelson et al. | |
| 6,559,435 B2 | 5/2003 | Schofield et al. | |
| 6,570,998 B1 | 5/2003 | Ohtsuka et al. | |
| 6,574,033 B1 | 6/2003 | Chui et al. | |
| 6,578,017 B1 | 6/2003 | Ebersole et al. | |
| 6,587,573 B1 | 7/2003 | Stam et al. | |
| 6,589,625 B1 | 7/2003 | Kothari et al. | |
| 6,593,011 B2 | 7/2003 | Liu et al. | |
| 6,593,698 B2 | 7/2003 | Stam et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,627,918 B2 | 9/2003 | Getz et al. | |
| 6,631,316 B2 | 10/2003 | Stam et al. | |
| 6,631,994 B2 | 10/2003 | Suzuki et al. | |
| 6,636,258 B2 | 10/2003 | Strumolo | |
| 6,672,731 B2 | 1/2004 | Schnell et al. | |
| 6,678,056 B2 | 1/2004 | Downs | |
| 6,690,268 B2 | 2/2004 | Schofield et al. | |
| 6,693,524 B1 | 2/2004 | Payne | |
| 6,700,605 B1 | 3/2004 | Toyoda et al. | |
| 6,703,925 B2 | 3/2004 | Steffel | |
| 6,704,621 B1 | 3/2004 | Stein et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,735,506 B2 | 5/2004 | Breed et al. | |
| 6,744,353 B2 | 6/2004 | Sjonell | |
| 6,757,109 B2 | 6/2004 | Bos | |
| 6,762,867 B2 | 7/2004 | Lippert et al. | |
| 6,795,221 B1 | 9/2004 | Urey | |
| 6,807,287 B1 | 10/2004 | Hermans | |
| 6,823,241 B2 | 11/2004 | Shirato et al. | |
| 6,824,281 B2 | 11/2004 | Schofield et al. | |
| 6,847,487 B2 | 1/2005 | Burgner | |
| 6,864,911 B1 * | 3/2005 | Zhang | G03B 35/08 |
| | | | 348/E5.025 |
| 6,864,930 B2 | 3/2005 | Matsushita et al. | |
| 6,882,287 B2 | 4/2005 | Schofield | |
| 6,889,161 B2 | 5/2005 | Winner et al. | |
| 6,904,522 B1 * | 6/2005 | Benardeau | H04N 21/4367 |
| | | | 713/168 |
| 6,909,753 B2 | 6/2005 | Meehan et al. | |
| 6,946,978 B2 | 9/2005 | Schofield | |
| RE38,898 E * | 11/2005 | Tsukamoto | H04N 21/4334 |
| | | | 375/E7.017 |
| 6,975,775 B2 | 12/2005 | Rykowski et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,085,637 B2 | 8/2006 | Breed et al. | |

(56) References Cited

U.S. PATENT DOCUMENTS

| | | | |
|---|---|---|---|
| 7,092,548 B2 | 8/2006 | Laumeyer et al. | |
| 7,113,867 B1 | 9/2006 | Stein | |
| 7,116,246 B2 | 10/2006 | Winter et al. | |
| 7,133,661 B2 | 11/2006 | Hatae et al. | |
| 7,149,613 B2 | 12/2006 | Stam et al. | |
| 7,151,996 B2 | 12/2006 | Stein | |
| 7,195,381 B2 | 3/2007 | Lynam et al. | |
| 7,202,776 B2 | 4/2007 | Breed | |
| 7,224,324 B2 | 5/2007 | Quist et al. | |
| 7,227,459 B2 | 6/2007 | Bos et al. | |
| 7,227,611 B2 | 6/2007 | Hull et al. | |
| 7,375,803 B1 | 5/2008 | Bamji | |
| 7,423,821 B2 | 9/2008 | Bechtel et al. | |
| 7,541,743 B2 | 6/2009 | Salmeen et al. | |
| 7,565,006 B2 | 7/2009 | Stam et al. | |
| 7,566,851 B2 | 7/2009 | Stein et al. | |
| 7,605,856 B2 | 10/2009 | Imoto | |
| 7,620,780 B1* | 11/2009 | Anderson | G06F 12/0284 |
| | | | 711/149 |
| 7,633,383 B2 | 12/2009 | Dunsmoir et al. | |
| 7,639,149 B2 | 12/2009 | Katoh | |
| 7,676,087 B2 | 3/2010 | Dhua et al. | |
| 7,720,580 B2 | 5/2010 | Higgins-Luthman | |
| 7,786,898 B2 | 8/2010 | Stein et al. | |
| 7,843,451 B2 | 11/2010 | Lafon | |
| 7,855,778 B2 | 12/2010 | Yung et al. | |
| 7,930,160 B1 | 4/2011 | Hosagrahara et al. | |
| 7,949,486 B2 | 5/2011 | Denny et al. | |
| 8,017,898 B2 | 9/2011 | Lu et al. | |
| 8,064,643 B2 | 11/2011 | Stein et al. | |
| 8,082,101 B2 | 12/2011 | Stein et al. | |
| 8,164,628 B2 | 4/2012 | Stein et al. | |
| 8,224,031 B2 | 7/2012 | Saito | |
| 8,233,045 B2 | 7/2012 | Luo et al. | |
| 8,254,635 B2 | 8/2012 | Stein et al. | |
| 8,300,886 B2 | 10/2012 | Hoffmann | |
| 8,378,851 B2 | 2/2013 | Stein et al. | |
| 8,421,865 B2 | 4/2013 | Euler et al. | |
| 8,452,055 B2 | 5/2013 | Stein et al. | |
| 8,553,088 B2 | 10/2013 | Stein et al. | |
| 8,988,558 B2* | 3/2015 | Chong | H04N 23/662 |
| | | | 348/211.3 |
| 9,508,014 B2 | 11/2016 | Lu et al. | |
| 9,710,410 B2* | 7/2017 | Sengoku | G06F 13/4282 |
| 9,769,381 B2 | 9/2017 | Lu et al. | |
| 11,277,558 B2 | 3/2022 | Fluegel | |
| 2001/0002451 A1 | 5/2001 | Breed | |
| 2002/0005778 A1 | 1/2002 | Breed et al. | |
| 2002/0011611 A1 | 1/2002 | Huang et al. | |
| 2002/0048455 A1* | 4/2002 | Tamura | G03B 29/00 |
| | | | 396/18 |
| 2002/0056043 A1* | 5/2002 | Glass | G06F 21/32 |
| | | | 713/179 |
| 2002/0113873 A1 | 8/2002 | Williams | |
| 2002/0118958 A1* | 8/2002 | Ishikawa | H04N 5/772 |
| | | | 348/E5.014 |
| 2002/0181709 A1* | 12/2002 | Sorimachi | H04L 9/0637 |
| | | | 380/265 |
| 2003/0028886 A1* | 2/2003 | Wang | H04N 7/106 |
| | | | 348/E5.002 |
| 2003/0103142 A1 | 6/2003 | Hitomi et al. | |
| 2003/0133018 A1* | 7/2003 | Ziemkowski | H04N 23/662 |
| | | | 348/E5.029 |
| 2003/0137586 A1 | 7/2003 | Lewellen | |
| 2003/0222982 A1 | 12/2003 | Hamdan et al. | |
| 2004/0150724 A1* | 8/2004 | Nozaki | H04N 23/651 |
| | | | 348/E5.053 |
| 2004/0164228 A1 | 8/2004 | Fogg et al. | |
| 2005/0009524 A1* | 1/2005 | Garani | H04W 4/08 |
| | | | 455/445 |
| 2005/0219852 A1 | 10/2005 | Stam et al. | |
| 2005/0237385 A1 | 10/2005 | Kosaka et al. | |
| 2006/0007485 A1* | 1/2006 | Miyazaki | H04N 1/2112 |
| | | | 358/1.15 |
| 2006/0018511 A1 | 1/2006 | Stam et al. | |
| 2006/0018512 A1 | 1/2006 | Stam et al. | |
| 2006/0036853 A1* | 2/2006 | Chen | G06Q 20/3674 |
| | | | 713/161 |
| 2006/0056056 A1 | 3/2006 | Ahiska et al. | |
| 2006/0062394 A1* | 3/2006 | Kamijo | H04L 9/0836 |
| | | | 380/282 |
| 2006/0091813 A1 | 5/2006 | Stam et al. | |
| 2006/0103727 A1 | 5/2006 | Tseng | |
| 2006/0250501 A1 | 11/2006 | Wildmann et al. | |
| 2007/0024724 A1 | 2/2007 | Stein et al. | |
| 2007/0104476 A1 | 5/2007 | Yasutomi et al. | |
| 2007/0211138 A1* | 9/2007 | Graham | H04N 21/632 |
| | | | 348/14.01 |
| 2007/0229678 A1* | 10/2007 | Barrus | H04N 1/32128 |
| 2007/0242339 A1 | 10/2007 | Bradley | |
| 2007/0285282 A1 | 12/2007 | Nakayama et al. | |
| 2007/0297607 A1 | 12/2007 | Ogura et al. | |
| 2008/0043099 A1 | 2/2008 | Stein et al. | |
| 2008/0114877 A1* | 5/2008 | Mori | H04L 12/4035 |
| | | | 709/224 |
| 2008/0147321 A1 | 6/2008 | Howard et al. | |
| 2008/0186382 A1 | 8/2008 | Tauchi et al. | |
| 2008/0189381 A1* | 8/2008 | Poirier | H04L 63/0428 |
| | | | 709/208 |
| 2008/0192132 A1 | 8/2008 | Bechtel et al. | |
| 2008/0226255 A1* | 9/2008 | Estes | H04N 5/782 |
| | | | 386/223 |
| 2008/0260028 A1* | 10/2008 | Lamy-Bergot | H04N 19/70 |
| | | | 375/E7.199 |
| 2008/0266396 A1 | 10/2008 | Stein | |
| 2009/0113509 A1 | 4/2009 | Tseng et al. | |
| 2009/0152943 A1 | 6/2009 | Diab et al. | |
| 2009/0160987 A1 | 6/2009 | Bechtel et al. | |
| 2009/0190015 A1 | 7/2009 | Bechtel et al. | |
| 2009/0256938 A1 | 10/2009 | Bechtel et al. | |
| 2009/0290032 A1 | 11/2009 | Zhang et al. | |
| 2011/0216201 A1 | 9/2011 | McAndrew et al. | |
| 2011/0310219 A1 | 12/2011 | Kim et al. | |
| 2012/0045112 A1 | 2/2012 | Lundblad et al. | |
| 2012/0062743 A1* | 3/2012 | Lynam | B60W 10/20 |
| | | | 348/148 |
| 2012/0069185 A1 | 3/2012 | Stein | |
| 2012/0194735 A1 | 8/2012 | Luo | |
| 2012/0200707 A1 | 8/2012 | Stein et al. | |
| 2012/0257056 A1* | 10/2012 | Otuka | G06T 1/0007 |
| | | | 348/148 |
| 2012/0274808 A1* | 11/2012 | Chong | H04N 23/631 |
| | | | 348/E9.053 |
| 2012/0314071 A1 | 12/2012 | Rosenbaum et al. | |
| 2012/0320209 A1 | 12/2012 | Vico et al. | |
| 2013/0141580 A1 | 6/2013 | Stein et al. | |
| 2013/0147957 A1 | 6/2013 | Stein | |
| 2013/0169812 A1 | 7/2013 | Lu et al. | |
| 2013/0177212 A1* | 7/2013 | Wright | G06N 7/01 |
| | | | 382/104 |
| 2013/0286193 A1 | 10/2013 | Pflug | |
| 2013/0286207 A1* | 10/2013 | Oba | H04N 9/74 |
| | | | 348/148 |
| 2014/0018101 A1* | 1/2014 | Namba | H04W 4/46 |
| | | | 455/456.2 |
| 2014/0043473 A1 | 2/2014 | Gupta et al. | |
| 2014/0063254 A1 | 3/2014 | Shi et al. | |
| 2014/0098229 A1 | 4/2014 | Lu et al. | |
| 2014/0107863 A1* | 4/2014 | Ishigooka | H04L 12/40169 |
| | | | 701/1 |
| 2014/0247352 A1 | 9/2014 | Rathi et al. | |
| 2014/0247354 A1 | 9/2014 | Knudsen | |
| 2014/0320658 A1 | 10/2014 | Pliefke | |
| 2014/0327774 A1* | 11/2014 | Lu | H04N 23/698 |
| | | | 348/148 |
| 2014/0333729 A1 | 11/2014 | Pflug | |
| 2014/0347486 A1 | 11/2014 | Okouneva | |
| 2014/0350834 A1 | 11/2014 | Turk | |
| 2015/0070500 A1* | 3/2015 | Pflug | H04N 23/86 |
| | | | 348/148 |

(56) References Cited

U.S. PATENT DOCUMENTS

| | | | | |
|---|---|---|---|---|
| 2015/0103171 A1* | 4/2015 | Cho | B60R 16/00 | 348/148 |
| 2015/0121274 A1* | 4/2015 | Kishimoto | B60K 35/50 | 715/771 |
| 2015/0127193 A1* | 5/2015 | Tofilescu | G07C 9/00309 | 701/2 |
| 2015/0293745 A1* | 10/2015 | Suzuki | G08G 1/16 | 704/260 |
| 2016/0039342 A1* | 2/2016 | Jones | H04N 7/181 | 348/148 |
| 2016/0065849 A1* | 3/2016 | Homma | H04N 23/90 | 348/36 |
| 2017/0064408 A1* | 3/2017 | Ketola | H04N 21/6334 | |
| 2017/0091559 A1* | 3/2017 | Hurtado | B60Q 9/008 | |
| 2017/0113614 A1 | 4/2017 | Fluegel | | |
| 2020/0403933 A1* | 12/2020 | Jiao | H04L 67/10 | |

FOREIGN PATENT DOCUMENTS

| JP | S58110334 A | 6/1983 |
|---|---|---|
| JP | 59114139 | 7/1984 |
| JP | 6080953 | 5/1985 |
| JP | S6216073 | 4/1987 |
| JP | 6414700 | 1/1989 |
| JP | H1168538 A | 7/1989 |
| JP | H236417 | 8/1990 |
| JP | H2117935 A | 9/1990 |
| JP | 3099952 | 4/1991 |
| JP | H06227318 A | 8/1994 |
| JP | 07105496 | 4/1995 |
| JP | 2630604 | 7/1997 |
| JP | 200274339 A | 3/2002 |
| JP | 200383742 A | 3/2003 |
| JP | 2003324649 A * | 11/2003 |
| JP | 20041658 A | 1/2004 |
| JP | 2004120608 A | 4/2004 |

* cited by examiner

MULTI-CAMERA VEHICULAR VISION SYSTEM

CROSS REFERENCE TO RELATED APPLICATIONS

The present application is a continuation of U.S. patent application Ser. No. 15/420,239, filed Jan. 31, 2017, now U.S. Pat. No. 11,277,558, which claims the filing benefits of U.S. provisional application Ser. No. 62/289,442, filed Feb. 1, 2016, which is hereby incorporated herein by reference in its entirety.

FIELD OF THE INVENTION

The present invention relates generally to a vehicle vision system for a vehicle and, more particularly, to a vehicle vision system that utilizes two or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes two or more cameras (preferably two or more CMOS cameras) to capture image data representative of images exterior of the vehicle, with one of the cameras comprising a master camera and at least one other of the cameras comprising a slave camera. The master camera includes a view generator and combines image data captured by the master camera with image data signals of the slave camera(s) to generate an image for display at a display of the vehicle. Thus, the master camera includes aspects of a control unit, whereby the vision system eliminates the need of a separate control unit.

According to an aspect of the present invention, a vision system of a vehicle includes a plurality of cameras configured to be disposed at a vehicle so as to have a field of view exterior of the vehicle. A display device is operable to display images for viewing by a driver of the vehicle. Each of the plurality of cameras captures image data. The plurality of cameras comprises a master camera and at least one (such as three or five) slave camera, which communicates a signal to the master slave camera representative of image data captured by the at least one slave camera. The master camera comprises an image signal processor for processing image data captured by at least the master camera. The master camera comprises a view generator operable to generate images (derived from image data captured by the master camera and the at least one slave camera) for display by said display device.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
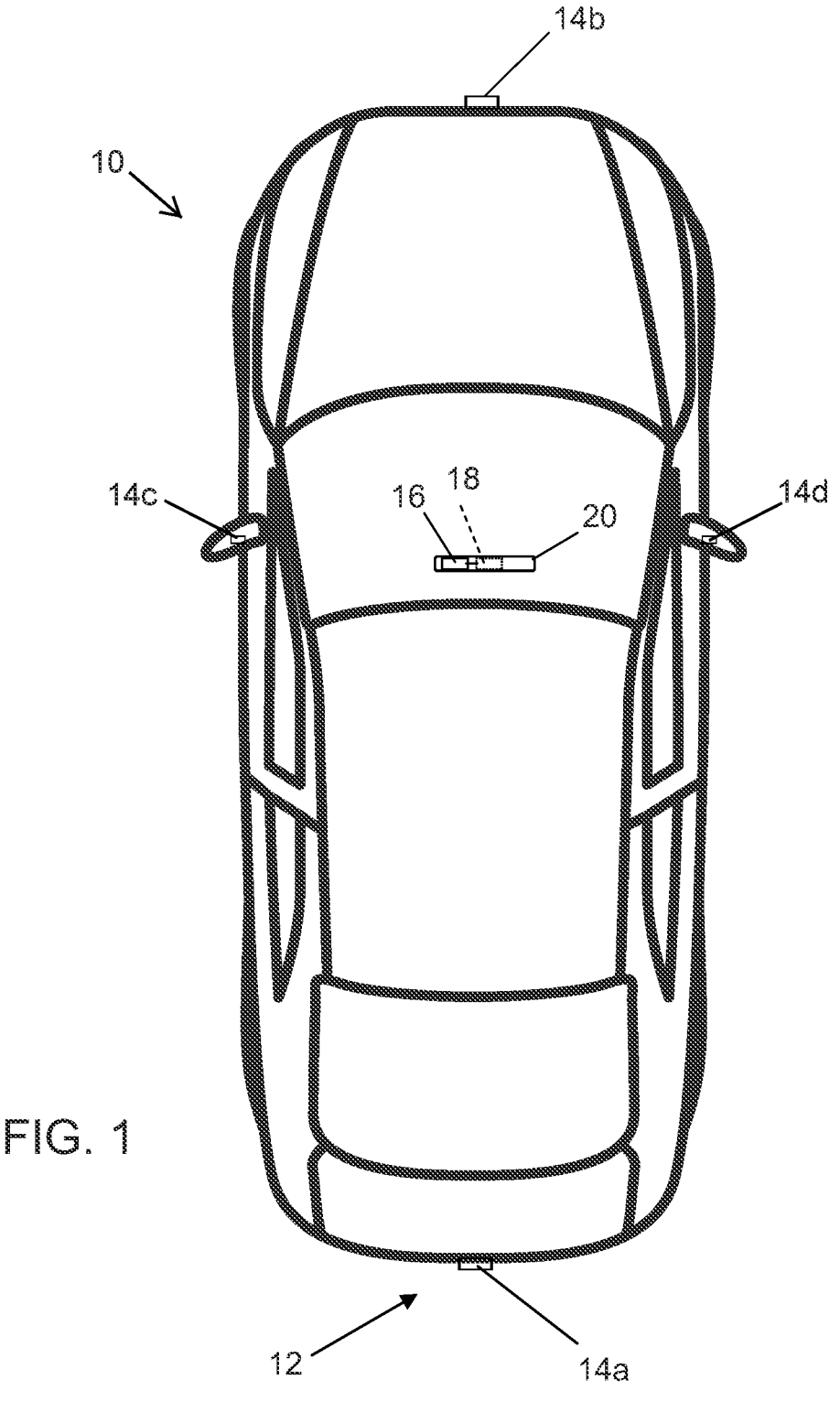
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

A common solution in surround view/top view/bird's eye view vehicle systems (SVS) that have cameras with Ethernet based data transmissions typically employs a main ECU receiving the data from the cameras, which then typically generates the desired view such as the bird's eye top view or another selected view such as, for example, a reverse directed view (rear view) or the like. Typically, the display is attached to the ECU for presenting the selected or generated view to the vehicle occupants. The display device typically receives the image to view via analog NTSC or digitally, often serialized via APIX, or via a LVDS line. Optionally, the display device may be connected via another Ethernet line or link. Due to limited bandwidth for transferring high resolution images, the vision data often becomes compressed via a compression codec. In automotive applications, Mjpg and H.264 have been established, and soon there may be a new H.265 compression standard.

When transferring compressed camera video data via Ethernet to an ECU, the data of every camera needs to be decompressed in the ECU for further processing (image signal processing done by an image signal processor or ISP) and for view generation before the resulting video image is compressed for being transferred to a display device, when the display device is attached via Ethernet. Typical view generation function blocks are view warping, image stitching, blending and overlay generation, optionally under consideration of specific mapping tables for specific artificial views or perspectives such as views differing from vertically top down or other parameters. The ISP typically comprises Debayering, HDR Tone mapping and image enhancement such as de-noising. Additional algorithms such as camera calibration, camera synchronization, object detection and/or the like may be processed as well by the ECU.

Figure 2:
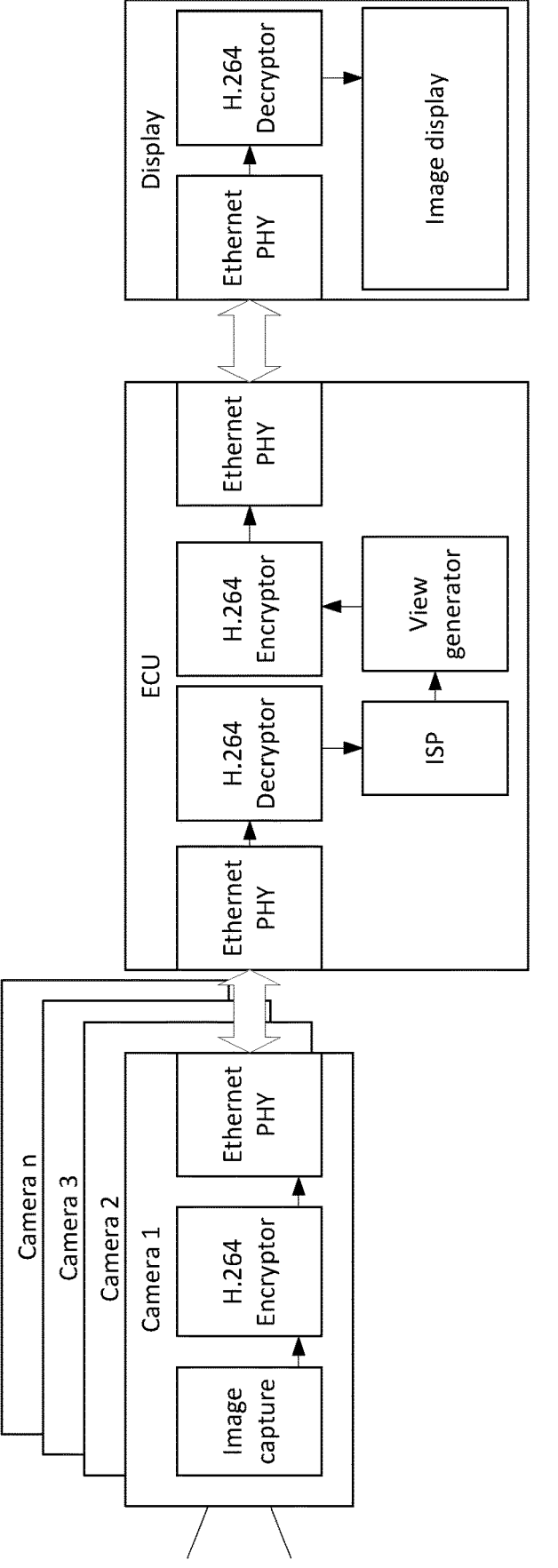
FIG. 2 is a schematic of an image chain configuration of a typical four camera compressed Ethernet SVS and a display connected via compressed Ethernet.
Figure 3:
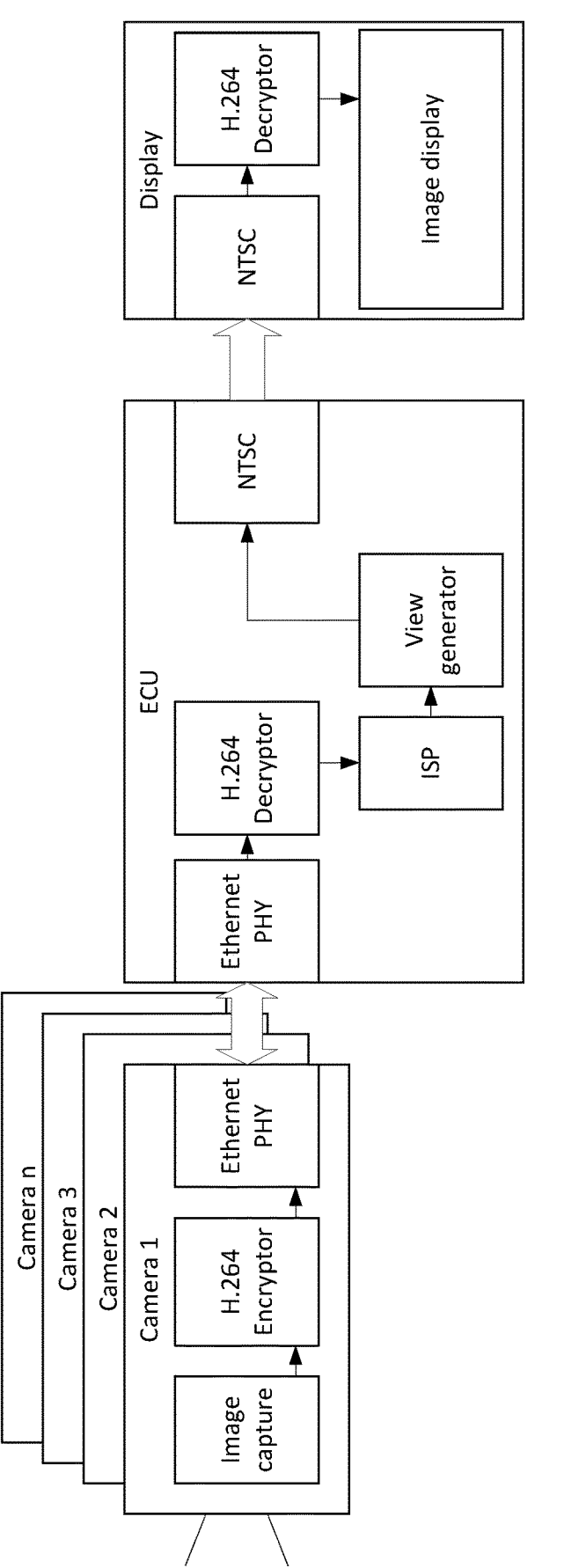
FIG. 3 is a schematic of an image chain configuration of a typical four camera compressed Ethernet SVS and a display connected via NTSC.

An example of an image chain configuration of a typical four camera compressed Ethernet SVS and a display connected via compressed Ethernet is shown in FIG. 2. And an example of an image chain configuration of a typical four camera compressed Ethernet SVS and a display connected via NTSC is shown in FIG. 3.

Figure 4:
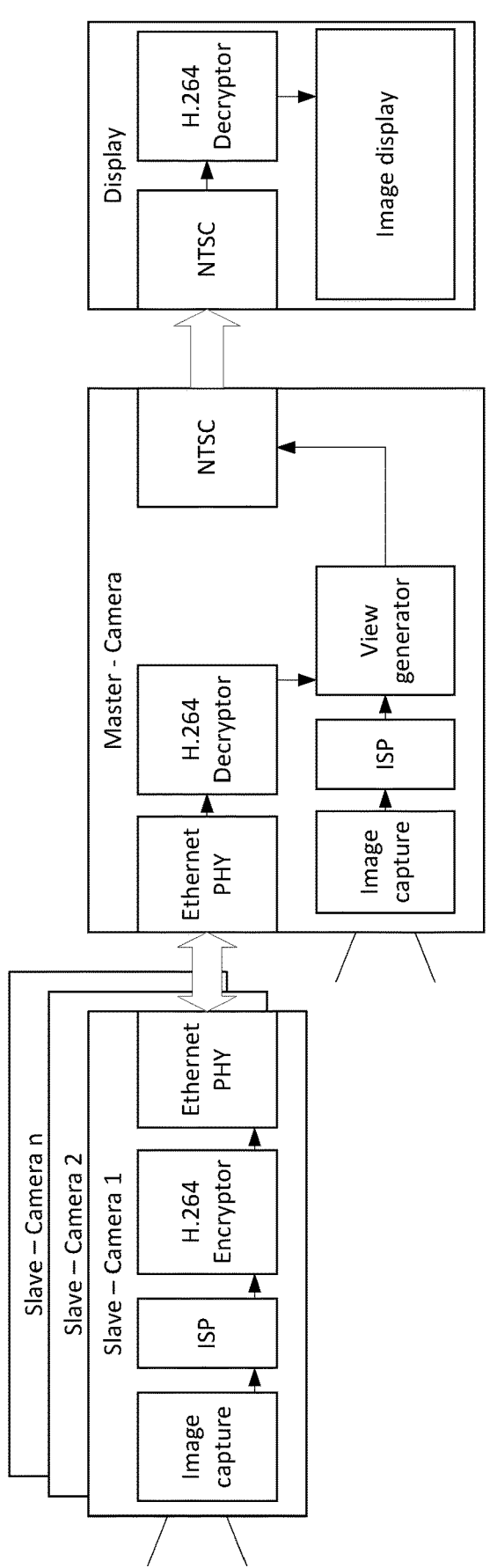
FIG. 4 is a schematic of a vision system having a master camera and at least three slave cameras in accordance with the present invention.
Figure 5:
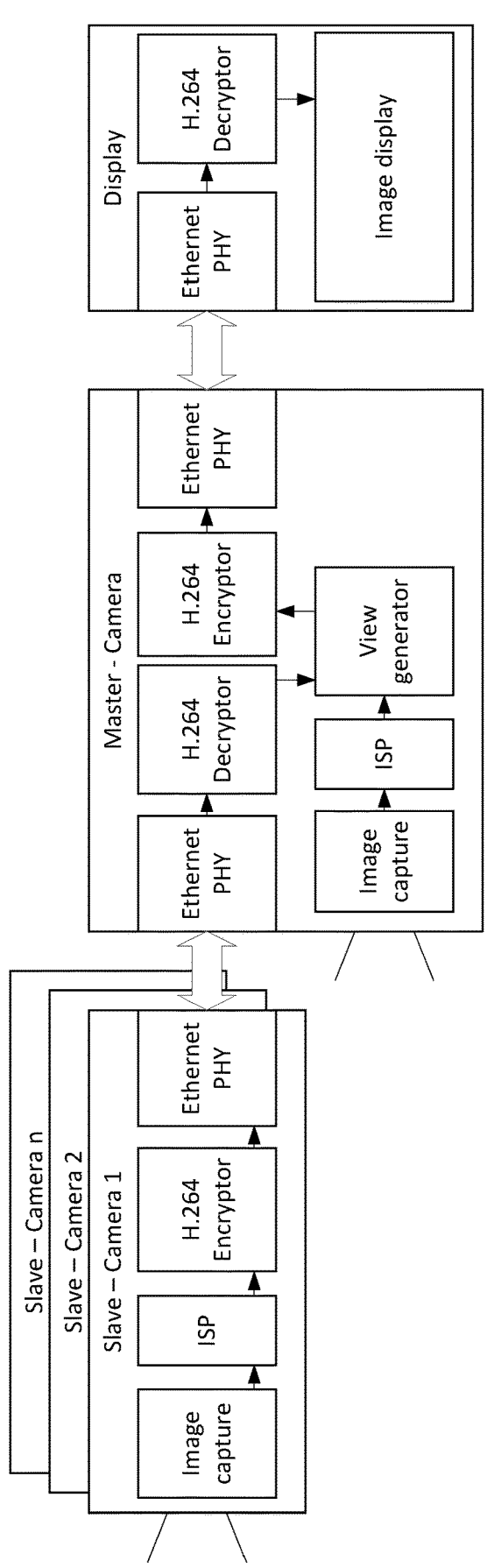
FIG. 5 is a schematic of another vision system having a master camera and at least three slave cameras in accordance with the present invention.

The present invention provides a vision system that provides or includes the ECU functionality in one of the cameras as a master camera, sparing the ECU device instead. The non-master cameras are referred to herein as slave cameras. The slave cameras may stay identically (compare to conventional SVS Ethernet cameras) or optionally may comprise an additional image signal processor (ISP), by that the ISP will be done on each slave camera and for the image captured by the master camera on the master camera, such as shown in FIGS. 4 and 5. On a four camera SVS, the master camera includes a decryptor that decrypts the image data of three slave cameras (that has been encrypted by the respective slave camera after image signal processing and before communication to the master camera) and generates a view out of these three slave image signals and its own captured image signal.

Figure 6:
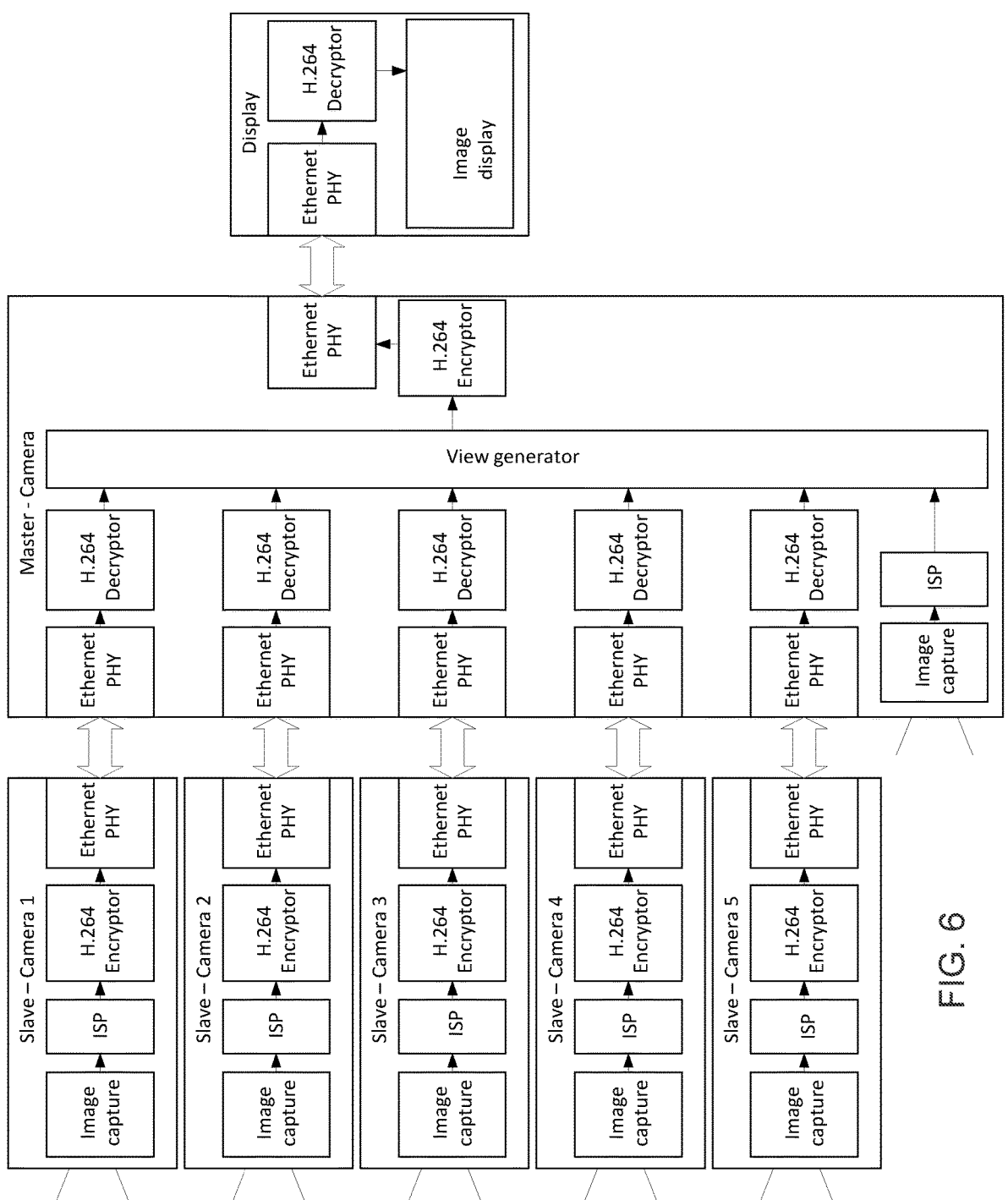
FIG. 6 is a schematic of a vision system having a master camera and at least five slave cameras in accordance with the present invention.

On a six camera SVS, the master camera decrypts the encrypted data received from five slave cameras and generates a view out of these five slave images signal and its own captured image signal, such as shown in FIG. 6. For every configuration, having one master camera instead of an ECU and at least one slave camera, one pair of Ethernet PHYs, one decryption block, and one encryption block can be spared, which reduces system costs and enhances the image quality. The master camera may require a larger space due to holding more components and having more connectors. Because the choice is free as to which of the four (or more or less) cameras will be the master camera, the camera with the most space freedom can be selected to be the master (for example, the master camera may be selected to be a forward viewing camera at a forward portion of the vehicle, a rearward viewing camera at a rearward portion of the vehicle, a driver-side viewing camera at a driver-side portion (such as at an exterior driver-side rearview mirror) of the vehicle, or a passenger-side viewing camera at a passenger-side portion (such as at an exterior passenger-side rearview mirror) of the vehicle. Signal-wise, an architecture with the least common data line length (for connections with the master camera) is preferred.

The master-slave camera configuration of the present invention may utilize aspects of the systems described in U.S. Publication No. US-2014-0327774 and/or U.S. patent application Ser. No. 15/334,365, filed Oct. 26, 2016, now U.S. Pat. No. 10,187,590, which are hereby incorporated herein by reference in their entireties.

The cameras or sensors may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Publication No. US-2014-0327774 and/or U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 2012/158167; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548;

WO 2013/109869; WO 2013/123161; WO 2013/126715; WO 2013/043661; WO 2013/158592 and/or WO 2014/204794, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system comprising:
at least three cameras disposed at a vehicle equipped with the vehicular vision system;
wherein each camera of the at least three cameras captures respective image data;
wherein the at least three cameras comprises a first camera, a second camera, and a third camera;
wherein the first camera is disposed at an in-cabin side of a windshield of the vehicle and views through the windshield forward of the vehicle;
wherein the first camera comprises a first CMOS imaging array having at least one million photosensor elements arranged in rows and columns;
wherein the second camera comprises a second CMOS imaging array having at least one million photosensor elements arranged in rows and columns;
wherein the second camera comprises an encryptor that encrypts image data that is captured by the second camera;
wherein the third camera comprises an encryptor that encrypts image data that is captured by the third camera;
wherein the first camera comprises a plurality of decryptors that each decrypts image data encrypted by a respective one of the second camera and the third cameras, and wherein the plurality of decryptors do not decrypt image data captured by the first camera;
wherein each of the second camera and the third camera transmits encrypted image data to the first camera; and
wherein (i) image data captured by the first camera is processed at an electronic control unit (ECU) at the first camera for a machine vision system of the vehicle, (ii) image data captured by the second camera is processed at the ECU at the first camera for the machine vision system of the vehicle, and (iii) image data captured by the third camera is processed at the ECU at the first camera for the machine vision system of the vehicle.

2. The vehicular vision system of claim 1, wherein the ECU comprises an image processing chip.

3. The vehicular vision system of claim 1, wherein the second camera and the first camera are connected via a communication bus of the vehicle.

4. The vehicular vision system of claim 1, wherein the second camera and the first camera are connected via an Ethernet connection.

5. The vehicular vision system of claim 1, wherein image data captured by the first camera is unencrypted.

6. The vehicular vision system of claim 1, wherein the second camera views exterior of the vehicle.

7. The vehicular vision system of claim 1, wherein the second camera comprises a left-side viewing camera disposed at a left-side portion of the vehicle, and wherein the third camera comprises a right-side viewing camera disposed at a right-side portion of the vehicle.

8. The vehicular vision system of claim 7, wherein the second camera is disposed at an exterior left-side rearview mirror assembly of the vehicle, and wherein the third camera is disposed at an exterior right-side rearview mirror assembly of the vehicle.

9. The vehicular vision system of claim 1, wherein the third camera comprises a third CMOS imaging array having at least one million photosensor elements arranged in rows and columns.

10. The vehicular vision system of claim 1, wherein image data captured by at least the first camera is processed at the ECU for at least one selected from the group consisting of (i) a traffic sign recognition system of the vehicle, (ii) a headlamp control system of the vehicle, (iii) a pedestrian detection system of the vehicle, (iv) a collision avoidance system of the vehicle and (v) a lane marker detection system of the vehicle.

11. The vehicular vision system of claim 1, wherein the image data captured and encrypted by the second camera is provided to the first camera as compressed video image data.

12. The vehicular vision system of claim 11, wherein the compressed video image data is provided to the first camera via an Ethernet link.

13. A vehicular vision system comprising:
at least three cameras disposed at a vehicle equipped with the vehicular vision system;
wherein each camera of the at least three cameras captures respective image data;
wherein the at least three cameras comprises a first camera, a second camera and a third camera;
wherein the first camera is disposed at an in-cabin side of a windshield of the vehicle and views through the windshield forward of the vehicle;
wherein the first camera comprises a first CMOS imaging array having at least one million photosensor elements arranged in rows and columns;
wherein the second camera comprises a left-side viewing camera disposed at a left-side portion of the vehicle;
wherein the second camera comprises a second CMOS imaging array having at least one million photosensor elements arranged in rows and columns;
wherein the second camera comprises an encryptor that encrypts image data that is captured by the second camera;
wherein the third camera comprises a right-side viewing camera disposed at a right-side portion of the vehicle;
wherein the third camera comprises a third CMOS imaging array having at least one million photosensor elements arranged in rows and columns;
wherein the third camera comprises an encryptor that encrypts image data that is captured by the third camera;
wherein the first camera comprises a plurality of decryptors that each decrypts image data encrypted by a respective one of the second camera and the third camera, and wherein the plurality of decryptors do not decrypt image data captured by the first camera;
wherein the second camera transmits encrypted image data to the first camera, and wherein the third camera transmits encrypted image data to the first camera; and
wherein image data captured by the first camera is processed at an electronic control unit (ECU) at the first camera for a headlamp control system of the vehicle and at least one selected from the group consisting of (i) a traffic sign recognition system of the vehicle, (ii) a pedestrian detection system of the vehicle, (iii) a collision avoidance system of the vehicle and (iv) a lane marker detection system of the vehicle.

14. The vehicular vision system of claim 13, wherein the ECU comprises an image processing chip.

15. The vehicular vision system of claim 13, wherein image data captured by the first camera is unencrypted.

16. The vehicular vision system of claim 13, wherein the second camera is disposed at an exterior left-side rearview mirror assembly of the vehicle, and wherein the third camera is disposed at an exterior right-side rearview mirror assembly of the vehicle.

17. A vehicular vision system comprising:
at least three cameras disposed at a vehicle equipped with the vehicular vision system;
wherein each camera of the at least three cameras captures respective image data;
wherein the at least three cameras comprises a first camera, a second camera and a third camera;
wherein the first camera is disposed at an in-cabin side of a windshield of the vehicle and views through the windshield forward of the vehicle;
wherein the first camera comprises a first CMOS imaging array having at least one million photosensor elements arranged in rows and columns;
wherein the second camera comprises a left-side viewing camera disposed at a left-side portion of the vehicle;
wherein the second camera comprises a second CMOS imaging array having at least one million photosensor elements arranged in rows and columns;
wherein the second camera comprises an encryptor that encrypts image data that is captured by the second camera;
wherein the third camera comprises a right-side viewing camera disposed at a right-side portion of the vehicle;
wherein the third camera comprises a third CMOS imaging array having at least one million photosensor elements arranged in rows and columns;
wherein the third camera comprises an encryptor that encrypts image data that is captured by the third camera;
wherein the first camera comprises a plurality of decryptors that each decrypts image data encrypted by a respective one of the second camera and the third cameras, and wherein the plurality of decryptors do not decrypt image data captured by the first camera;
wherein the second camera transmits encrypted image data to the first camera, and wherein the third camera transmits encrypted image data to the first camera;
wherein image data captured by the first camera is processed at an electronic control unit (ECU) at the first camera for a pedestrian detection system of the vehicle and at least one selected from the group consisting of (i) a traffic sign recognition system of the vehicle, (ii), a headlamp control system of the vehicle (iii) a collision avoidance system of the vehicle and (iv) a lane marker detection system of the vehicle; and
wherein the second camera is connected to the ECU via a first wired connection, and wherein the third camera is connected to the ECU via a second wired connection.

18. The vehicular vision system of claim 17, wherein the ECU comprises an image processing chip.

19. The vehicular vision system of claim 17, wherein image data captured by the first camera is unencrypted.

20. The vehicular vision system of claim 17, wherein the second camera is disposed at an exterior left-side rearview mirror assembly of the vehicle, and wherein the third camera is disposed at an exterior right-side rearview mirror assembly of the vehicle.

21. The vehicular vision system of claim 17, wherein the first wired connection and the second wired connection comprise respective Ethernet connections.

* * * * *